UNITED STATES PATENT OFFICE.

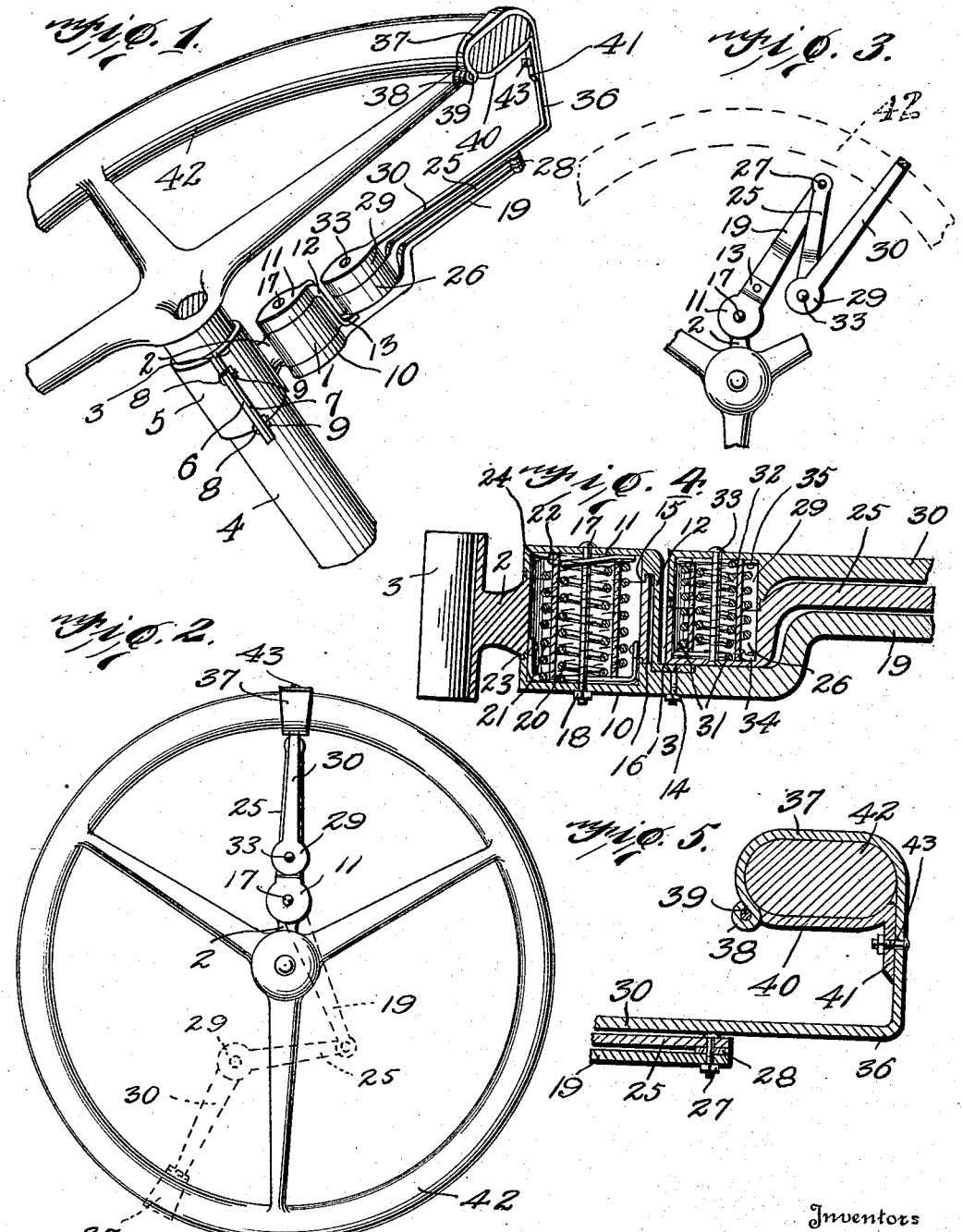

PAUL W. JOHNSON AND JAMES M. MILLER, OF SEDRO WOOLLEY, WASHINGTON.

STEERING-GEAR STABILIZER.

1,188,658.  Specification of Letters Patent.  Patented June 27, 1916.

Application filed November 26, 1915. Serial No. 63,594.

*To all whom it may concern:*

Be it known that we, PAUL W. JOHNSON and JAMES M. MILLER, citizens of the United States of America, residing at Sedro Woolley, in the county of Skagit and State of Washington, have invented certain new and useful Improvements in Steering-Gear Stabilizers, of which the following is a specification, reference being had therein to the accompanying drawing.

This invention relates to a steering gear stabilizer and has for its principal object the production of a simple and efficient means which will very readily swing the steering wheel to its normal position when the steering wheel is released, thereby causing the steering gear to direct a vehicle in a straight line even though the steering wheel is not gripped.

Another object of this invention is the production of a steering gear stabilizer in which a number of arms are employed which are normally urged in a central alinement with each other by means of a number of coiled springs so that the driver of the automobile will be assisted in retaining the steering wheel in a set position for driving the automobile in a straight line and, furthermore, the coiled springs will cause the arms to swing the steering wheel when the same is released, to its normal position, provided the same has been turned.

With these and other objects in view this invention consists of certain novel combinations, constructions, and arrangements of parts as will be hereinafter fully described and claimed.

In the accompanying drawing: Figure 1 is a detail perspective view of the steering gear stabilizer, showing the same connected to the steering post and steering wheel. Fig. 2 is a top plan view of the steering gear stabilizer, showing the same as applied to the steering wheel. Fig. 3 is a top plan view of the invention, partly in section, illustrating the same in a slightly expanded position, portions of the steering wheel being shown in elevation and broken away. Fig. 4 is a central vertical section through the housing and a portion of the stabilizer, the arms being broken away. Fig. 5 is a fragmentary sectional view through the forward ends of the arms, illustrating how the device is connected to the steering wheel.

Referring to the accompanying drawing by numerals it will be seen that the steering gear stabilizer comprises a hollow casing 1 upon which the lug 2 is integrally formed. The primary section 3 of the clamp is formed upon this lug 2 so as to partially embrace the steering post 4, as clearly shown in Fig. 1. The auxiliary section 5 of the clamp also embraces the post and has its flange 6 engaging the flange 7 of the section 3, whereby the bolts 8 having the nuts 9 may be passed through the flanges 6 and 7 for fixedly retaining the sections 3 and 5 in a set position upon the steering post 4. Thus it will be seen that the casing 1 will be held at a desired position upon the steering post.

The base 10 fits upon the lower portions of the casing 1, while the cap 11 fits upon the upper portions thereof. This cap 11 is provided with a finger 12 terminating in the angularly extending lip 13. This lip 13 rests upon the base 10, as shown in Fig. 4, and through this lip and base there, extends the bolt 14 for fixedly securing the lip in engagement with the base. The base and cap are each provided with rims 15 which fit within the grooves 16 of the casing 1, thereby holding the cap and base against lateral displacement. The retaining rod 17 extends through the cap 11, the central portions of the casing 1, and base 10, so as to carry a nut 18 upon its lower end for holding these elements in engagement with each other. Therefore, it will be seen that the base 10 which carries the main arm 19 will be held upon the casing 1. The coiled springs 20 and 21 are positioned within the casing 1 and are spaced apart by means of the cuff 22, which is interposed therebetween. The ends of these coiled springs 20 and 21 are connected to the inner portions of the casing 1, as shown at 23, and at their opposite ends to the cap 11, as shown at 24. These coiled springs are oppositely wound, as clearly shown in Fig. 4, and, therefore, they will normally retain the arm 19 in a central position, since when the arm is swung to one side one coiled spring will be wound more tightly than the other, thus causing the spring which is wound to the greatest degree to swing the arm 19 backwardly to its normal position.

The intermediate arm 25 is provided with the primary section 26 of the remaining spring housing, which primary section 26 is formed out of alinement with the arm 25. This arm 25 is connected at its outer end by means of a bolt and nut 27 to the outer end of the main arm 19, although these arms are spaced apart by means of the spacing block 28, which is interposed therebetween as clearly shown in Fig. 5. The auxiliary section 29 of the upper arm 30 is positioned upon the primary section 26, whereby the sections 26 and 29 will constitute a spring housing within which the coiled springs 31 are positioned. These springs 31 are also spaced apart by means of the cuff 32 while the sections 26 and 29 are held in engagement with each other by means of the rivet bolt 33. These springs 31 are also oppositely wound and are connected to the section 36, as shown at 34, and to the section 29, as shown at 35, so as to cause the arms 25 and 30 to be normally urged into alinement with each other.

The outer end of the arm 30 is bent upwardly, as shown at 36, terminating in the overhanging portion 37, which terminates in the eye 38. This eye 38 carries the pin 39 to which the jaw 40 is pivotally secured and this jaw 40 carries the depending ear 41 which is adapted to engage the upwardly extending portion 36 of the arm 30. It will be seen by referring particularly to Fig. 5 that the overhanging portion 37 and the jaw 40 are adapted to firmly embrace the steering wheel 42, at which time the bolt and nut may engage the upwardly extending portion 36 and the nut and bolt 43 for fixedly retaining the jaw in a set position, whereby the arm 30 will be permanently and positively held in engagement with the steering wheel 42.

When this steering gear stabilizer is in use it will be seen that it will normally assume the position disclosed in Fig. 1. At this time the position of the springs within the spring housing and spring casing are neutral and, therefore, all the arms will be held in alinement with each other. When, however, it is desired to turn the automobile from a direct line the operator must necessarily turn the steering wheel 42, which action will cause the arm 30 to be first swung to one side, thus winding one of the springs 32. As the arm 30 continues to swing to one side it will draw the intermediate arm 25 to one side, which intermediate arm will in turn draw the main arm 19 to one side, thus winding one of the springs within the spring casing 1. The steering wheel 42 may continue to turn until the stabilizer assumes the position disclosed in dotted lines in Fig. 2. Of course, at this time a plurality of the springs will be very tightly wound so that upon the releasing of the wheel 42, or in any event by urging the same even to a small extent, the wheel will again assume its normal position, at which time the stabilizer will also assume its normal position, as disclosed in Fig. 1. When the wheel is turned only to a small degree the stabilizer will, of course, be in the position disclosed in Fig. 3. Since the springs within the spring casing and housing are oppositely wound it will be seen that although the wheel may be moved in either direction it will be immediately returned to its normal position when released. Therefore, it will be seen that a very simple and efficient steering gear stabilizer has been produced which will retain the steering wheel in its normal position for causing an automobile to move in a straight course under normal conditions, and which is further constructed so as to return the steering wheel to its normal position after the same has been turned for directing the automobile to one side, so that when returned to its normal position the automobile will be again directed in a straight course. It is obvious that the device might be used in connection with all vehicles, such as aeroplanes and motor boats, without departing from the spirit of the invention.

What is claimed is:

1. In a steering gear stabilizer of the class described, the combination of a plurality of arms, means for connecting said arms to the steering wheel of an automobile and to the steering post thereof, means for urging said arms into alinement with each other, whereby said arms will normally retain the steering wheel in a set position and will return the same to its normal position when released.

2. In a steering gear stabilizer of the class described, the combination of a plurality of arms, means for connecting said arms to the steering wheel and steering post of an automobile, springs attached to said arms for retaining the same normally in alinement with each other, at which time an automobile will be directed in a straight line, said springs being adapted to return said arms to their normal positions when the steering wheel is released.

3. In a steering gear stabilizer, the combination of a spring casing, a lug formed upon said spring casing, a clamping section formed upon said lug, a second clamping section permanently mounted in engagement with said first-mentioned clamping section for retaining the stabilizer in a set position upon the steering post of an automobile, oppositely wound springs carried by said spring casing, and means connected to said springs and carried upon said spring casing for engaging the steering wheel of an automobile for normally retaining the steering wheel in a set position or for returning the steering wheel to its normal position when released.

4. In a steering gear stabilizer, the combination of a spring casing, a lug formed upon said spring casing, a clamping section formed upon said lug, a second clamping section permanently mounted in engagement with said first-mentioned clamping section for retaining the stabilizer in a set position upon the steering post of an automobile, oppositely wound springs carried by said spring casing, a base positioned upon the lower portion of said spring casing, a cap carried upon the upper portions thereof, a finger extending from said cap and terminating in a lip, means for permanently securing said lip upon said base, a central bolt passing through said cap, casing, and base for holding these elements in engagement with each other, a main arm extending from said base, said springs being adapted to normally retain said arm in a central position, and means for connecting said arm to the steering wheel of an automobile, whereby said arm will retain said steering wheel in its normal position or will return the steering wheel to its normal position after the wheel has been turned to one side and then released.

5. In a steering gear stabilizer, the combination of a spring casing, means for connecting said spring casing to the steering post of an automobile, oppositely wound springs positioned within said spring casing, an arm mounted upon said spring casing, said springs being connected to said arm, an intermediate arm pivotally mounted upon the outer end of said main arm, an upper arm positioned above said intermediate arm, said intermediate arm and said upper arm being provided with a sectional spring housing upon their inner ends, means for pivotally retaining said sectional spring housing in a central position, oppositely wound springs carried within said sectional spring housing and being connected to the ends thereof, whereby said arms may be normally retained in alinement with each other, and means for connecting the forward end of said upper arm to the steering wheel of an automobile, whereby the steering wheel will be normally retained in a set position, said arms being capable of being swung or drawn to one side as the steering wheel is turned, thereby winding a plurality of said springs so that upon the release of the steering wheel, the springs which have just been wound will cause the arms to return to their normal positions thus returning the steering wheel to its normal position.

6. In a steering gear stabilizer, the combination of a spring casing, means for connecting said spring casing to the steering post of an automobile, oppositely wound springs positioned within said spring casing, an arm mounted upon said spring casing, said springs being connected to said arm, an intermediate arm pivotally mounted upon the outer end of said main arm, an upper arm positioned above said intermediate arm, said intermediate arm and said upper arm being provided with a sectional spring housing upon their inner ends, means for pivotally retaining said sectional spring housing in a central position, oppositely wound springs carried within said spring housing and being connected to the ends thereof, whereby said arms will be normally retained in alinement with each other, said upper arm terminating in an upwardly extending portion having an overhanging portion, a jaw pivotally connected to said overhanging portion, means for clamping said jaw and overhanging portion upon the steering wheel of an automobile, whereby said springs will retain the steering wheel in its normal position, said springs being adapted to be wound within said casing and said housing when the steering wheel is swung to one side, whereby when the steering wheel is released said arms will be returned to their normal positions for returning the steering wheel to its normal position.

In testimony whereof we hereunto affix our signatures.

PAUL W. JOHNSON.
JAMES M. MILLER.

Copies of this patent may be obtained for five cents each, by addressing the "Commissioner of Patents, Washington, D. C."